Aug. 17, 1971 R. POSNER 3,600,489

METHOD OF MAKING A MOLD

Filed Nov. 25, 1968

INVENTOR.
Richard Posner
BY
*Samuel P. Sprecens*
ATTORNEY

United States Patent Office 3,600,489
Patented Aug. 17, 1971

---

3,600,489
METHOD OF MAKING A MOLD
Richard Posner, East Northport, N.Y., assignor to Creative Polymer Products Corp., Long Island City, N.Y.
Filed Nov. 25, 1968, Ser. No. 784,998
Int. Cl. B29c 27/22
U.S. Cl. 264—135                                       1 Claim

---

ABSTRACT OF THE DISCLOSURE

A mold is made by covering one surface of a first slab of polymerizable material which flows under pressure with a separating material. A pattern is then placed on this so-covered surface and a second slab of the polymerizable material placed over the pattern and the so-covered surface. A compressive force is applied to the slabs which are then polymerized.

---

There is also disclosed a method of covering at least the first slab with a film of plastic barrier material which is covered with a heat activated bonding agent to bond the film to the slab.

This invention pertains to the making of molds and more particularly to the making of molds for casting plastics and the like.

Present molds for casting plastics are either made from steel which is hand engraved or from bronze castings. Such molds, by the very nature of fabrication, are very expensive and take a considerable time to make.

In order to amortize the fabrication costs, the mold must be used for large runs or the cost per finished product must be high. Therefore, such molds have limited applications. In order to broaden the field of use, cheaper molds are required.

It is, accordingly, a general object of the invention to provide an improved method of making molds.

It is another object of the invention to provide an improved method of making molds for casting plastics.

It is a further object of the invention to provide a method of making molds which permits deep undercutting.

It is yet another object of the invention to provide a method of making split face molds which saves considerable time and money when compared with presently available methods.

Briefly, the invention contemplates a method of making a mold for an object by placing a separating material on one surface of a first slab of preformed elastomeric material which is flowable under at least pressure. A pattern of the object is then placed on that surface. Thereafter, a second slab of material which is at least partially rigid is placed on the pattern and over the top surface of the first slab. A compressing force is applied to the slabs so that at least the first slab is deformed to conform to the pattern and the slabs abut, and at least the first slab is polymerized.

A feature of the invention concerns the application of a barrier material in the form of a sheet of plastic material to at least the first slab.

Other objects, features and the advantages of the invention will be apparent from the following detailed description when read with the accompanying drawing which illustrates steps for practicing the invention.

Figure 1:
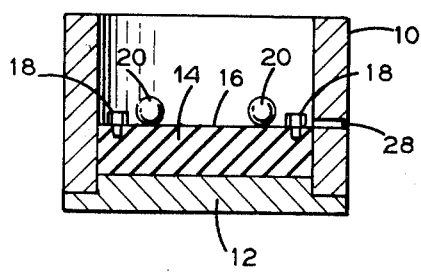
FIGS. 1, 2 and 3 show, in section, steps of making a mold by placing slabs of polymerizable mold material in a retainer ring.
Figure 2:
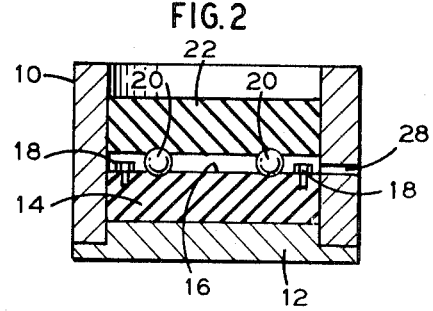
Figure 3:
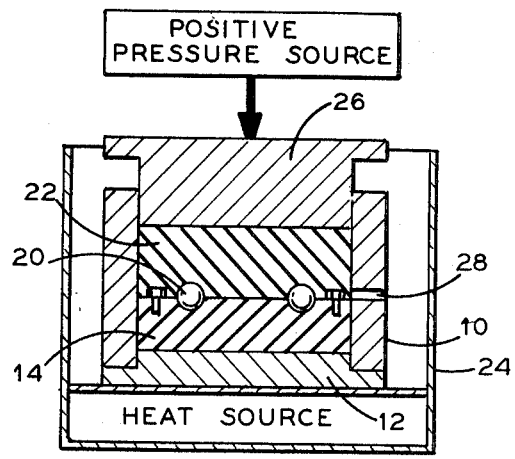

In FIG. 1, there is shown a retainer ring 10 in the form of a hollow cylinder of metal with a bottom plate 12 of the same metal which acts as a pressure base sealer. Within the cavity, so defined, is placed at least one circular slab 14 of a preformed polymerizable elastomeric type material which is flowable under at least pressure. Such materials can be, for example, natural rubbers, elastomeric-type rubbers such as Viton, neoprene or any such synthetic rubber in an unvulcanized or unpolymerized state. It should be noted that the type of mold to be made can dictate a choice of materials. If a thin mold with deep draws or absolute absence of parting lines is desired a high durometer material should be used. If the molded object has undercuttings a low durometer should be used.

A separating agent is then applied to the top surface 16 of slab 14. Typical separating agents can be talcum powder, silicone spray mold release, Teflon spray mold release, etc. In addition, a thin film of polyvinyl alcohol could be used.

Next, locking devices 18 are inserted into slab 14. These devices have a portion extending upward for engaging the top half of the finished mold to align both halves of the mold. A simple locking device can be a hex-headed screw wherein the shank portion is embedded in slab 14 with the head exposed.

Then, patterns 20 are placed on the top surface 16. If the molds are to be used in a centrifugal molding operation, the patterns are preferably placed along radii of the slab and spaced from the center to have dynamic balance.

Thereafter, a circular top slab 22 of the same material and shape as slab 14 is placed on the patterns 20. The retainer ring assemblage is then placed in a heat and pressure source 24 and the piston portion 26 thereof is fitted into the top of ring 10. A positive pressure is applied to compress the slabs toward each other. Generally, simultaneously therewith or a period of time after the start of application of the pressure, heat is applied to the retainer ring assemblage. If the patterns are brittle it may be desirable to apply heat before applying pressure so as to soften the slabs sufficiently to prevent breaking of the patterns. The polymerizable material softens and flows occuping all voids with any air exiting from port 28. The positive pressure is applied during the heating and cooling cycle to minimize any shrinkage. It should be noted that the polymerizing time, temperature and pressure are determined by the type of material used and such parameters are well known.

Figure 6:
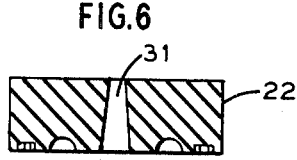
FIG. 6 shows a section of one of the slabs with a sprue therein.
Figure 7:
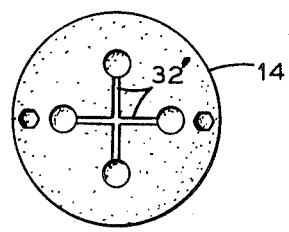
FIG. 7 shows a top view of one of the slabs with runners therein.

Thereafter, the heat and pressure source is opened and the slabs removed. The slabs are separated and the patterns removed. A sprue 31 is cut into the top slab 22 (FIG. 6) and runners 32′ cut into bottom slab 14 (FIG. 7). It should be noted that although the sprue and runners are cut into the slabs, they could equally well have been formed by using patterns just as the patterns 20 were used to form the mold cavities.

Figure 4:
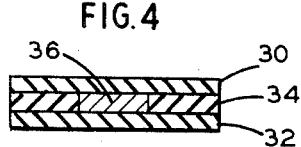
FIG. 4 is a cross-sectional view of a slab of mold material in accordance with another embodiment of the invention.

While it is preferred to use positive pressure during the polymerization step to minimize shrinkage it is also possible to imbed a rigid member in the slabs. FIG. 4 shows such a technique. One of the slabs is built up of three layers. Upper and lower layers 30 and 32 are circular discs of the polymerizable material while the central layer 34 is an annulus of this material. The central opening of the annulus is filled with a disc 36 of rigid material such as steel. This three-layer assemblage acts as one slab, say lower slab 14. Of course, no separating material is placed in the interfaces between the layers.

In the event that a problem exists because of the particular plastic which is to be cast by the mold, such as sticking to the mold or chemically attacking the mold, the mold halves can be permanently lined with a film which acts as a barrier layer. Typical films can be Teflon, nylon, polyvinyl chloride or polyvinyl fluoride, etc.

Figure 5:
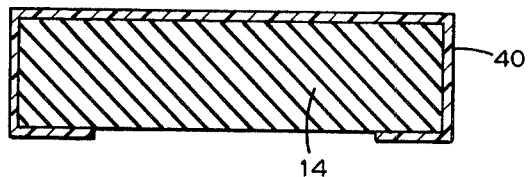
FIG. 5 is an enlarged cross-sectional view of a slab of mold material in accordance with a further embodiment of the invention.

In such a case, the top and bottom slabs are assembled with the barrier films prior to their insertion in the retainer ring. In FIG. 5, there is shown such an assemblage. Either the back of barrier film 40 or the top and sides of slab 14 or both are coated with a bonding agent which is activated by at least heat. Typical bonding agents are Chemlock 220 and Chemlock 234 made by Hughson Chemical Company of Erie, Pa. If the barrier film is Teflon its surface which will contact the slab must be chemically etched. Top slab 22 is prepared in the same manner.

Now the mold is made in the same manner as before except that the barrier film can be considered to also act as the separating material. Several variations of the pressure and heating steps are worth noting. In the event that the barrier film is thermoplastic, preheating of the assemblage in the heat and pressure source to a temperature less than the polymerizing temperature of the slabs and the activation temperature of the bonding agent before the application of pressure will give perfect detail for the final "lined" cavity. If the barrier film is Teflon, then pressure without heating is done first so that the slab material and the Teflon can "cold flow" to the desired contours. Thereafter, the polymerizing heat and pressure are applied.

Although there has been described the making of a mold with only top and bottom halves, more complex multiple layer molds can be built by merely laying out patterns on various slab layers, making certain that at each level there is a separating material.

There has thus been shown a process for making molds extremely rapidly and inexpensively as compared to conventional split-face, multiple-cavity and/or multiple layer molds. The molds, according to the invention, can be used for polymerizable plastics and the like using injection and compression molding techniques.

There will now be obvious to those skilled in the art many modification and variations satisfying many or all of the objects of the invention but which do not depart from the spirit thereof as defined by the appended claim.

What is claimed is:

1. The method of making a mold for an object comprising the steps of applying a heat activatable bonding agent to one surface of a first slab of polymerizable elastometric material which is flowable before polymerization, applying the heat activatable bonding agent to an etched surface of a first sheet of homogenous plastic material, placing said first sheet on said first slab so that the surfaces bearing the heat activatable bonding agent abut, placing a pattern of the object on the exposed surface of the first sheet, applying the heat activatable bonding agent to one surface of a second slab of polymerizable elastometric material which is flowable before polymerization, applying the heat activatable bonding agent to an etched surface of a second sheet of the homogenous plastic material, placing said second sheet on said second slab so that the surfaces bearing the heat activatable bonding agent abut, placing the combination of said second sheet and said second slab on said pattern with the exposed surfaces of said sheets being in opposed relationship, initially applying a compressive force to said slabs and sheets at a temperature below the temperature for activating the heat activatable bonding agent and polymerizing said slabs for a period of time to permit said sheets and said slabs to cold flow to their final surface contours whereby said sheets and said slabs are deformed to conform to said pattern and the exposed surfaces of said sheets abut and thereafter applying heat with sufficient temperature to activate the heat activatable bonding agent and polymerize said slabs.

References Cited

UNITED STATES PATENTS

| 1,958,184 | 5/1934 | Cross | 264—337X |
| 2,039,105 | 4/1936 | Naery | 264—206 |
| 2,306,516 | 12/1942 | Zann | 264—220X |
| 2,714,226 | 8/1955 | Axelrad | 264—337X |
| 3,041,660 | 7/1962 | Fink | 264—316 |
| 3,101,065 | 8/1963 | Kalis | 264—337X |
| 3,120,680 | 2/1964 | Villasana | 264—292X |
| 2,028,710 | 1/1936 | Swan | 264—220X |
| 2,982,683 | 5/1961 | Boyce | 264—266X |
| 3,124,092 | 3/1964 | Raynes | 264—337X |
| 3,300,557 | 1/1967 | Valentini | 264—245X |

ROBERT F. WHITE, Primary Examiner

R. R. KUCIA, Assistant Examiner

U.S. Cl. X.R.

264—220